(12) United States Patent
Boday et al.

(10) Patent No.: US 9,228,034 B1
(45) Date of Patent: Jan. 5, 2016

(54) HEXAHYDROTRIAZINE, DITHIAZINE, AND THIOETHER FUNCTIONALIZED MATERIALS

(71) Applicant: International Business Machines Corporation, Armonk, NY (US)

(72) Inventors: Dylan J. Boday, Tucson, AZ (US); Jeannette M. Garcia, San Jose, CA (US); James L. Hedrick, Pleasanton, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/571,751

(22) Filed: Dec. 16, 2014

Related U.S. Application Data (63) Continuation of application No. 14/510,477, filed on Oct. 9, 2014.

(51) Int. Cl.
   *C08G 63/00* (2006.01)
   *C08F 12/28* (2006.01)
   *C08F 12/30* (2006.01)

(52) U.S. Cl.
   CPC ............. *C08F 12/28* (2013.01); *C08F 12/30* (2013.01)

(58) Field of Classification Search
   CPC ............ H01L 51/0067; H01L 51/0072
   USPC ........................................ 528/53, 186
   See application file for complete search history.

(56) References Cited

U.S. PATENT DOCUMENTS

| 2,889,277 A | 6/1959 | Hughes |
| 3,340,232 A | 9/1967 | Smith et al. |
| 3,598,748 A | 8/1971 | Hirosawa |
| 3,957,742 A | 5/1976 | Kveton |
| 4,106,904 A | 8/1978 | Oude Alink et al. |
| 4,224,417 A | 9/1980 | Hajek et al. |
| 4,225,481 A | 9/1980 | Wagner |

(Continued)

FOREIGN PATENT DOCUMENTS

| CN | 101265255 A | 9/2008 |
| EP | 2636697 A1 | 9/2013 |

(Continued)

OTHER PUBLICATIONS

Appendix P; List of IBM Patents or Patent Applications Treated as Related.

(Continued)

*Primary Examiner* — Shane Fang
(74) *Attorney, Agent, or Firm* — Patterson & Sheridan, LLP (57) ABSTRACT

Synthetic schemes for preparation of polymers and polymer precursors having various functional groups is provided. These synthetic schemes are used to prepare polymeric, oligomeric, or monomeric materials incorporating 1,3,5-hexahydrotriazine moieties. These hexandortriazine moieties can be further reacted to form dithiazine and thioether moieties. In certain synthetic schemes, 1,3,5-hexahydrotriazine moieties are incorporated as crosslinker groups for providing crosslinked polymeric materials. Crosslinker groups formed with these triazine moieties provide chemically reversible crosslinks, which allow such otherwise intractable crosslinked polymeric materials to be recycled and/or reprocessed by removal/reversal of crosslinks.

17 Claims, 7 Drawing Sheets

(56) References Cited

U.S. PATENT DOCUMENTS

| | | | |
|---|---|---|---|
| 4,246,160 | A | 1/1981 | Wagner et al. |
| 4,301,262 | A | 11/1981 | Wagner et al. |
| 4,310,633 | A * | 1/1982 | Haas et al. .................. 521/129 |
| 4,877,451 | A | 10/1989 | Winnik et al. |
| 5,112,796 | A | 5/1992 | Iannicelli |
| 5,674,377 | A | 10/1997 | Sullivan, III et al. |
| 5,830,243 | A | 11/1998 | Wolak et al. |
| 7,384,434 | B2 | 6/2008 | Malfer et al. |
| 2010/0107476 | A1 | 5/2010 | Cosimbescu |
| 2012/0049308 | A1 | 3/2012 | Nishimura et al. |

FOREIGN PATENT DOCUMENTS

| | | |
|---|---|---|
| GB | 928112 A | 6/1963 |
| GB | 1531578 A | 11/1978 |
| WO | 0166614 A2 | 9/2001 |
| WO | 0198388 A1 | 12/2001 |
| WO | 0226849 A1 | 4/2002 |

OTHER PUBLICATIONS

Henri Ulrich et al., Reaction of Chloromethyl Ether with Primary Amines, May 1961, pp. 1637-1638.

Hemant S. Patel et al., Studies on Synthesis and Characterization of some Novel Aromatic Copolyesters based on s-Triazine, Iranian Polymer Journal, vol. 14, No. 12, 2005, pp. 1090-1098.

Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.

Wang Yulan et al., Synthesis and Properties of Poly-1, 3, 5-Triazines, Polymer Communications, No. 2, 1984, pp. 117-123.

John Markoff, Error at IBM Lap Finds New Family of Materials, New York Times, May 15, 2014, 4 pages.

Jeanette M. Garcia et al., Recyclable, Strong Thermosets and Organogels via Paraformaldehyde Condensation with Diamines, Science AAAS, vol. 344, May 16, 2014, pp. 732-735.

D.R. Anderson et al., Thermally resistance polymers containing the s-triazine ring, Journal of Polymer Science Part A-1: Polymer Chemistry, vol. 4, Issue 7, pp. 1689-1702.

T. Okita, Filter method for the determination of trace quantities of amines, mercaptans, and organic sulphides in the atmosphere, Atmospheric Environment (1967), vol. 4, Issue 1, Jan. 1970, pp. 93-102.

Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.

Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.

Ferrar, "Reactions of Formaldehyde With Aromatic Amines," J. Appl. Chem, 14, 1964, 389-399.

Geng, et al., "Nanoindentation behavior of ultrathin polymeric films," Polymer 46 (2005) 11768-11772; Available online Oct. 19, 2005.

Hiller, et al., "Laser-engravable hexahydrotriazine polymer networks," Mat Res Innovat (2002) 6:179-184.

Oliver, et al. "Measurement of hardness and elastic modulus by; instrumented indentation: Advances in understanding and; refinements to methodology," J. Mater. Res., vol. 19, No. 1, Jan. 2004, 3-20.

Singh, et al., "Ultrasound mediated Green Synthesis of Hexa-hydro Triazines," J. Mater. Environ. Sci. 2 (4) (2011) 403-406.

Stafford, et al., "A buckling-based metrology for measuring; the elastic moduli of polymeric thin films," Nature Materials_Aug. 3, 2004, 545-550;Published online: Jul. 11, 2004.

U.S. Appl. No. 14/510,477, entitled Hexahydrotriazine, Dithiazine, and Thioether Functionalized Materials, filed Oct. 9, 2014.

Appendix P: List of IBM Patents or Patent Applications Treated as Related, Dec. 2014.

* cited by examiner

HEXAHYDROTRIAZINE, DITHIAZINE, AND THIOETHER FUNCTIONALIZED MATERIALS

CROSS-REFERENCE TO RELATED APPLICATIONS

This application is a continuation of co-pending U.S. patent application Ser. No. 14/510,477, filed Oct. 9, 2014. The aforementioned related patent application is herein incorporated by reference in its entirety.

INCORPORATION BY REFERENCE

Various example polyhexahydrotriazine and polyhemiaminal materials and synthetic details related thereto are provided in commonly assigned, co-pending application Ser. No. 14/050,995, filed in the USPTO on Oct. 10, 2013, the entirety of which is incorporated herein by reference.

BACKGROUND

The present disclosure relates to functionalized materials and more specifically to triazine, dithiazine, and thioether functionalized materials.

Synthesis of polyhexahydrotriazines (PHT) and polyhemiaminal (PHA) by the reaction of aromatic diamines and paraformaldehyde has been disclosed. These PHT and PHA materials have many desirable properties and potential uses. For example, PHT resins can be recycled to starting materials upon exposure to strong acids even though the PHT resins are initially highly crosslinked. PHT and PHA materials can also be used to scavenge hydrogen sulfide and will react with thiols to produce thioether polymers. It would, in general, be desirable to incorporate features of PHT and PHA materials into other materials.

SUMMARY

According to one embodiment of the present disclosure, a method includes exposing a first monomer including a primary amine functional group to paraformaldehyde and a first primary amine compound (R—NH$_2$). Reaction between the primary amine group on the first monomer with the paraformaldehyde and the first primary amine compound forms a second monomer including a 1,3,5-hexahydrotriazine group. The second monomer can then be polymerized. A first polymer including the 1,3,5-hexahydrotriazine group can be thus be formed using the second monomer. In an optional step, the first polymer can be exposed to hydrogen sulfide to form a dithiazine functionality. In a different optional step, the first polymer can be exposed to a thiol compound to form a thioether functionality.

According to another embodiment, a method includes polymerizing a first monomer having a primary amine functional group and forming a first polymer including the primary amine functional group. The first polymer is then exposed to paraformaldehyde and a first primary amine compound (R—NH$_2$) and a second polymer including a 1,3,5-hexahydrotriazine group is formed. In some embodiments, the first primary amine compound can have the same chemical structure as the first polymer and/or may be a portion of the first polymer.

According to still another embodiment, a polymer includes a first polymeric repeat unit with a first pendant group having a structure selected from:

wherein each R group represents a radical unit including at least one carbon and each starred (*) bond represents a point of attachment to the first polymeric repeat unit.

DETAILED DESCRIPTION

In general, a series of example synthetic schemes for preparation of polymers and polymer precursors having various functional groups is provided. These synthetic schemes are used to prepare polymeric, oligomeric, or monomeric materials incorporating 1,3,5-hexahydrotriazine moieties. These 1,3,5-hexahydrotriazine moieties can be further reacted to form dithiazine and thioether moieties. In certain synthetic schemes, 1,3,5-hexahydrotriazine moieties are incorporated as crosslinker groups for providing crosslinked polymeric materials. Crosslinker groups formed with hexahydrotriazine moieties provide chemically reversible crosslinks, which allow such otherwise intractable crosslinked polymeric materials to be recycled and/or reprocessed by removal/reversal of crosslinks.

Polymeric materials prepared according to the example schemes correspond to following structure:

$$BB\text{——}PG$$

where BB is a polymeric or oligomeric group. In some embodiments, BB has a structure incorporating at least one of the following chemical structures:

and PG has a chemical structure corresponding to one of the following:

where "R" corresponds to a radical unit including at least one carbon atom. "R" may be the same or different in each instance of use within the depicted chemical structures. That is, two or more "R" groups depicted in a single chemical structure are not necessarily the same radical unit, though they may be the same in some embodiments. Without limitation, a radical unit depicted as "R" may include an alkyl group, an aryl group, a silane group, an alkyne group, an alkene group, an alcohol group, an epoxide group, an amine group, a cyanate group, a carboxylic acid group, an ester group, a phenolic group, and/or a succinimide group. In specific embodiments, the radical unit depicted as "R" may be a methyl group, a methanol group, a primary amine substituted alkyl group, a tertiary amine substituted alkyl group, or a triethoxysilane group. "R" may also represent a portion of polymeric or oligomeric chain having a structure corresponding to the depicted BB. The starred (*) bond of the depicted BB and PG groups represent points of linkage between the BB and PG groups—that is, the starred (*) bond in the BB group is directly linked to the starred (*) bond in the PG group.

Certain example synthetic schemes of the present disclosure depict preparation and/or use of poly(4-aminostyrene) precursors, poly(4-aminostyrene) intermediates, and poly(4-aminostyrene) derivates. However, these examples are for purposes of explanation of various aspects of the present disclosure and should not be considered limiting. Other polymeric, oligomeric, and monomeric materials, precursors, intermediates, and derivates may be prepared and/or used according to the present disclosure. For example, 1,3,5-hexahydrotriazine moieties in monomeric, oligomeric, and polymeric materials can also be formed using amino-functionalized methacrylate materials, such as 2-amino-ethyl methacrylate, as starting material. Additionally, amino-functionalized polyaromatic carbonates, aliphatic polycarbonates, and poly(aryl ethers) can be used as starting materials for formation of 1,3,5-hexahydrotriazine moieties according to the present disclosure. In some embodiments, the starting material may be an amino-functionalized diol-type monomer such as 2-aminobenzene-1,4-diol or an amino-functionalized bisphenol-type monomer such as 2-amino-4-(3-amino-4-hydroxyphenyl)phenol or 2-amino-4-[2-(3-amino-4-hydroxyphenyl)propan-2-yl]phenol that may be polymerized in step-growth polymerizations or condensation-type polymerizations. In some embodiments, the monomer used as a starting material may be one of an amino-substituted styrene, an amino-substituted bisphenol, an amino-substituted aromatic diol, and an amino-substituted methacrylate. In this context, "poly(aryl ethers)" are polymers including aromatic (e.g., phenylene) and ether-type (—O—) linkages in the BB group.

In general, the BB group may be formed by any polymer-forming reaction in which a primary amine moiety can be a spectator—that is, uninvolved (or substantially uninvolved) in the polymerization reaction. Polymerization methods for forming the BB group include chain-growth polymerizations (e.g., free radical type polymerizations) and step-growth polymerizations (e.g., condensation polymerizations or addition polymerizations). In a particular example, nucleophilic aromatic substitution polymerizations can be used to form polymers including primary amine groups, which can then be used in formation of the above depicted PG groups. Many bisphenol compounds having at least one primary amine group thereon are available for formation of suitable polymeric materials via this route. Alternatively, some polymeric materials may be functionalized after polymerization to incorporate primary amine groups that then may be used in the formation of the above depicted PG groups.

Figure 1:
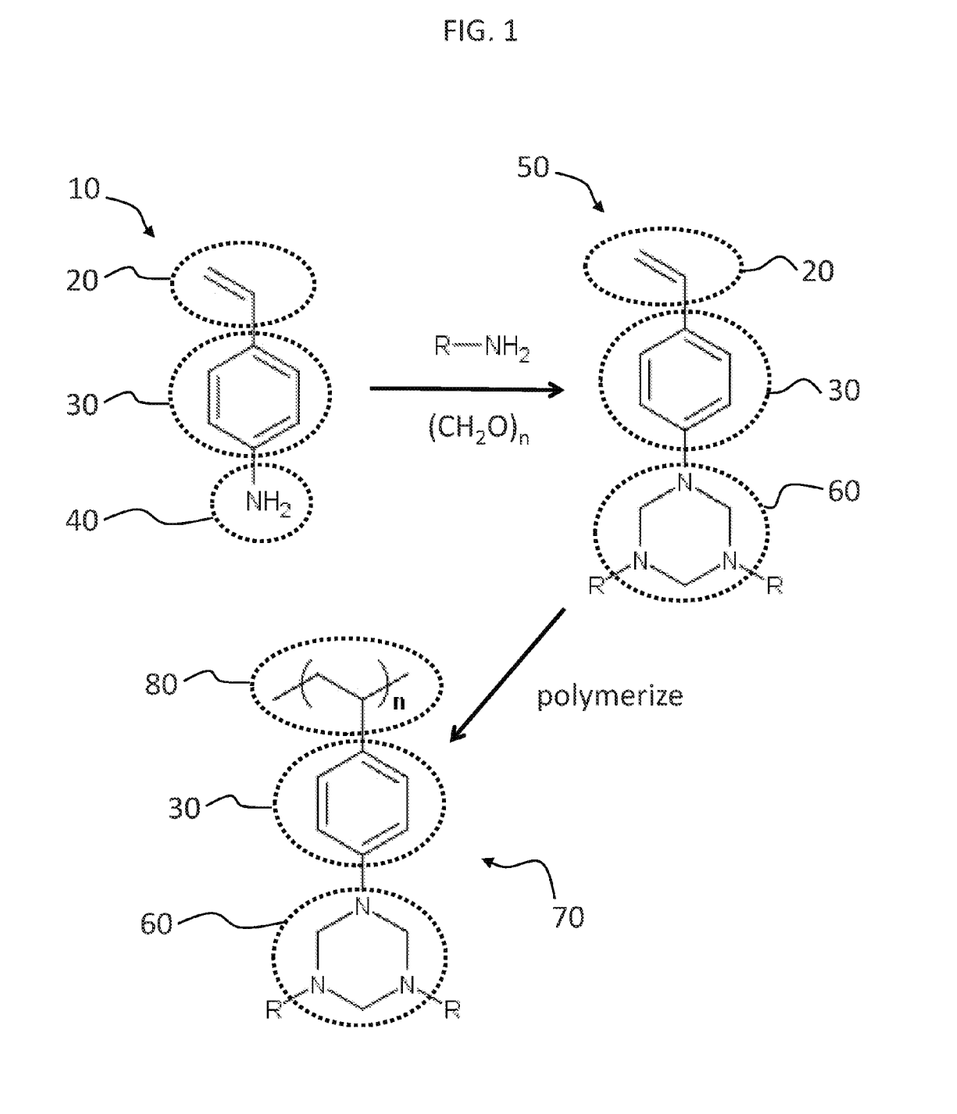
FIG. 1 depicts an exemplary synthetic scheme for preparing a 1,3,5-hexahydrotriazine functionalized monomer and a 1,3,5-hexahydrotriazine functionalized polymer

Referring now to FIG. 1, an exemplary synthetic scheme for preparing a 1,3,5-hexahydrotriazine functionalized monomer and a 1,3,5-hexahydrotriazine functionalized polymer is depicted. A starting material 10 includes a polymerizable group 20, a body group 30 connected to the polymerizable group 20, and a primary amine moiety 40 connected to the body group 30. Starting material 10 is reacted with a primary amine (R—NH$_2$) (a first primary amine compound) and paraformaldehyde ((CH$_2$O)$_n$) to form 1,3,5-hexahydrotriazine functionalized monomer 50. 1,3,5-hexahydrotriazine functionalized monomer 50 maintains the polymerizable group 20 and body group 30 from the starting material 10, however the primary amine moiety 40 reacts with primary amine (R—NH$_2$) and paraformaldehyde ((CH$_2$O)$_n$) to form 1,3,5-hexahydrotriazine moiety 60 as depicted. The "R" group of the primary amine (R—NH$_2$) is not specifically limited according to the present disclosure, but in this example "R" includes at least one carbon atom. The 1,3,5-hexahydrotriazine moiety 60 is linked to two "R" groups from the primary amine(s)—one at each of the nitrogen atoms at the nominal "3" and "5" positions of the triazine ring. The nitrogen atom at the nominal "1" position of the triazine ring is bonded to body group 30. The respective "R" groups linked to "3" and "5" nitrogen atoms in the 1,3,5-hexahydrotriazine moiety 60 do not necessarily have the same chemical structure and may be different from each other if, for example, a mixture of different primary amine compounds is provided in the reaction mixture.

The primary amine (R—NH$_2$) reacted with starting material 10 can be, without limitation, (3-aminopropyl)triethoxysilane (APTES), methylamine (CH$_3$NH$_2$), a primary amine substituted alkyl chain such as 1-ethylamine (CH$_3$CH$_2$NH$_2$), 1-propylamine (CH$_3$CH$_2$CH$_2$NH$_2$), or longer alkyl chains of generalized formula (CH$_3$(CH$_2$)$_n$NH$_2$), benzylamine (1-phenylmethanamine) (C$_6$H$_5$CH$_2$NH$_2$), isopropylamine (propan-2- amine) $((CH_3)_2CH_2NH_2))$ or branched alkyl chains with at least one primary amine functional group substituted thereon. The primary amine ($R-NH_2$) may also be a mixture of two or more primary amines of different structures.

1,3,5-hexahydrotriazine functionalized monomer 50 can be polymerized (via reaction of polymerizable group 20) to form 1,3,5-hexahydrotriazine functionalized polymer 70. 1,3,5-hexahydrotriazine functionalized polymer 70 has a polymeric backbone 80 and, as depicted in FIG. 1, pendant 1,3,5-hexahydrotriazine moiety 60 groups (via body group 30) on each of "n" repeat units. The number of repeat units ("n") (i.e., the degree of polymerization) of a 1,3,5-hexahydrotriazine functionalized polymer 70 is not specifically limited and may be any number accessible by the selected polymerization method. For example, a free radical initiated polymerization method may result in a polymeric material having a few hundred to several thousand repeat units on average. And while each individual molecule of 1,3,5-hexahydrotriazine functionalized polymer 70 has a specific, integer value of "n," 1,3,5-hexahydrotriazine functionalized polymer 70 as a material (as compared to an individual molecule of a material) will generally have a distribution of different "n" values rather than a single "n" value.

The polymerization of 1,3,5-hexahydrotriazine functionalized monomer 50 may be performed by any available technique, for example, and without limitation, the polymerization method can be radical-initiated or anionic-catalyzed solution phase polymerization, emulsion polymerization, suspension polymerization. The polymerization technique may be used to generate a polymer network, a star polymer, a copolymer, or a hyper-branched polymer according to the selected reaction conditions and methods.

While 1,3,5-hexahydrotriazine functionalized polymer 70 is depicted in FIG. 1 as a homopolymer (i.e., one type of repeat unit only), it is understood by those of ordinary skill in the art that other repeat unit types can be included in 1,3,5-hexahydrotriazine functionalized polymer 70. For example, inclusion of other monomeric materials having a polymerizable group similar to or the same as polymerizable group 20, it is possible to provide copolymers incorporating 1,3,5-hexahydrotriazine functionalized monomer 50 as one of at least two repeating groups. As a specific example, 1,3,5-hexahydrotriazine functionalized monomer 50 could be polymerized in the presence of styrene monomer to generate a copolymer including both styrene repeat units and 1,3,5-hexahydrotriazine functionalized repeat units.

A copolymer incorporating repeat units corresponding in structure to 1,3,5-hexahydrotriazine functionalized polymer 70 can be a random copolymer, alternating copolymer, periodic copolymer, statistical copolymer, and/or a block copolymer according to the selected copolymerization method and the selected co-monomer(s). Additionally, the number of different types of repeating units in a copolymer is not limited to two, but may also be three or more types.

As known in the art, depending on selected polymerization method, 1,3,5-hexahydrotriazine functionalized polymer 70 may also incorporate various end-chain groups ("end groups") that are not specifically depicted in FIG. 1, but which are understood to be present according to the polymerization method used in forming the 1,3,5-hexahydrotriazine functionalized polymer 70.

Polymerizable group 20 is depicted as a vinyl moiety on a phenyl ring type body group 30. However, this is a specific example presented for purposes of explanation only. Polymerizable group 20 is not limited to a vinyl moiety directly linked to a phenyl ring (that is, polymerizable group 20 and body group 30 do not have to collectively form a styrenyl group). For example, starting material 10 can be a primary amine functionalized methacrylate material. In other examples, starting material 10 can be a primary amine functionalized aromatic diol-type monomer or a primary amine functionalized bisphenol-type monomer that could be polymerized via nucleophilic aromatic substitution ($S_NAr$) reaction with a material such as, for example, 1-fluoro-4-(4-fluorobenzenesulfonyl)benzene.

Figure 2:
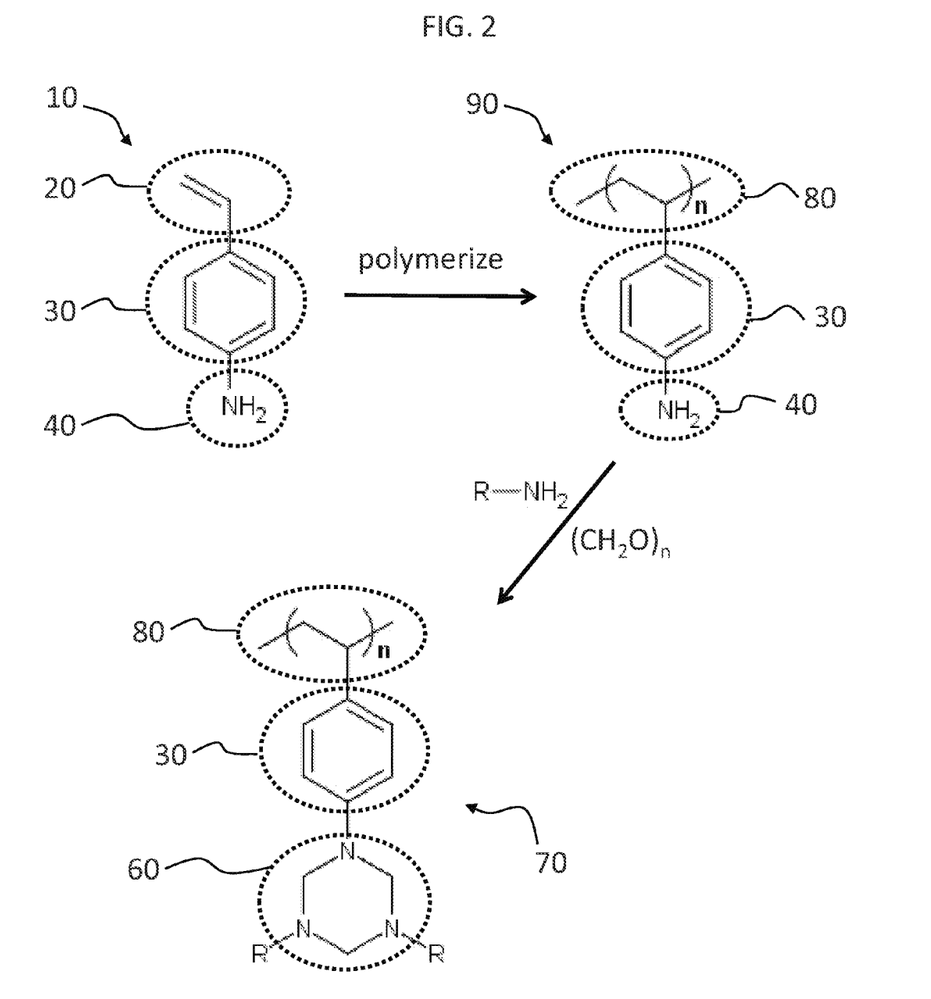
FIG. 2 depicts an exemplary synthetic scheme for preparing a 1,3,5-hexahydrotriazine functionalized polymer.

FIG. 2 depicts an exemplary synthetic scheme for preparing a 1,3,5-hexahydrotriazine functionalized polymer. When compared to FIG. 1, FIG. 2 depicts a route from starting material 10 to 1,3,5-hexahydrotriazine functionalized polymer 70 that does not proceed through the 1,3,5-hexahydrotriazine functionalized monomer 50. Rather, according to the scheme of FIG. 2, the starting material 10 is first polymerized to primary amine functionalized polymer 90, which is then reacted with a primary amine ($R-NH_2$) and paraformaldehyde $((CH_2O)_n)$ to from 1,3,5-hexahydrotriazine functionalized polymer 70. The 1,3,5-hexahydrotriazine functionalized polymers 70 prepared according to FIG. 1 and FIG. 2 are substantially similar and the primary amine ($R-NH_2$) used in the scheme depicted in FIG. 2 is as described above with respect to the scheme depicted in FIG. 1. While primary amine functionalized polymer 90 is depicted as a homopolymer in FIG. 2, it may also be copolymer having two or more different types of repeat units.

A potential advantage of the scheme of FIG. 2 is the polymerization method and conditions used to form primary amine functionalized polymer 90 may be selected without regard to the presence of 1,3,5-hexahydrotriazine moiety 60 and the "R" groups attached thereto. For example, the intended "R" groups in the final product 1,3,5-hexahydrotriazine functionalized polymer 70 may include moieties which are susceptible to reactions with radicals or other catalysts used in the formation of primary amine functionalized polymer 90. For example, the "R" group may include alkyne or alkene functionalities. The synthesis of primary amine functionalized polymer 90 could also include exposure to acids, which would react with a 1,3,5-hexahydrotriazine moiety 60 if it was present.

The synthetic route to primary amine functionalized polymer 90 is depicted in FIG. 2 as a single step from starting material 10; however synthesis of polymer 90 may be more complex. For example, primary amine functionalized polymer 90 could be a portion of a graft polymer, a comb polymer, a block copolymer, a star polymer, a hyper-branched polymer, or the like requiring a multiple step synthetic process. Also, because primary amine functionalized polymer 90 is separately synthesized, it can be "pre-processed" before the reaction step used for forming 1,3,5-hexahydrotriazine functionalized polymer 70. For example, primary amine functionalized polymer 90 can be sorted/filtered by molecular weight and/or purified by existing techniques after it is synthesized and before forming 1,3,5-hexahydrotriazine functionalized polymer 70.

Figure 3:
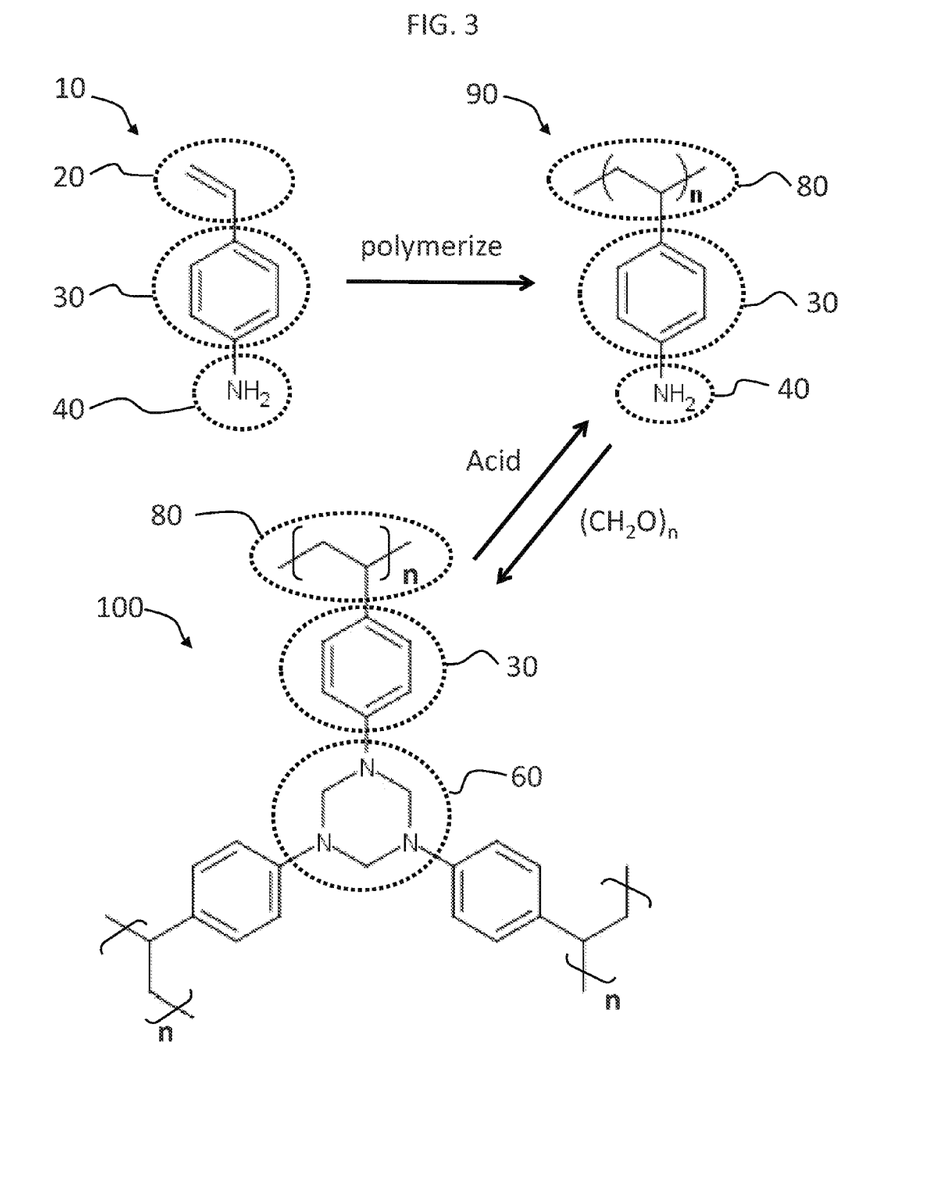
FIG. 3 depicts an exemplary synthetic scheme for preparing a chemically reversing crosslinked polymer material.

FIG. 3 depicts an exemplary synthetic scheme for preparing a chemically reversing crosslinked polymer material. When compared to FIG. 2, FIG. 3 depicts a route to a crosslinked polymer 100 from starting material 10 through a primary amine functionalized polymer 90. The initial polymerization step from starting material 10 to polymer 90 is the same as depicted in FIG. 2; however, instead of reacting polymer 90 with an additional primary amine ($R-NH_2$), only paraformaldehyde $((CH_2O)_n)$ is specifically provided to the reaction mixture. Thus, in effect, the primary amine group 40 on polymer 90 serves as the additional primary amine ($R-NH_2$) in the scheme, and the resulting crosslinked polymer 100 includes a 1,3,5-hexahydrotriazine moiety 60 linking three different body groups 30, which in turn are linked to three polymerized groups 80. The primary amine groups 40 serving as the primary amine (R—NH$_2$) may be located on different polymer chains or may be different repeat units within the same polymer chain. In such situations, the "R" group of the primary amine (R—NH$_2$) includes a body group 30 and a polymerized group 80 along with the other repeat units connected thereto.

In general, all other things being equal, a crosslinked material has improved mechanical strength and thermal stability as compared to the non-crosslinked material. But crosslinked materials are typically difficult to remove, recycle, or reprocess. However, the 1,3,5-hexahydrotriazine moiety 60 is chemically reversible to its precursor materials when exposed to acid. Thus, crosslinked polymer 100 can be reverted to its precursors (primary amine functionalized polymer 90 and paraformaldehyde) upon exposure to acid. Thus, crosslinked polymer 100 can be "de-crosslinked" and thus becomes removable, recyclable, and reprocessable even after being cured/set. For example, while crosslinked polymer 100 would generally (assuming a significant crosslink density) be insoluble in common solvents, primary amine functionalized polymer 90 can be selected so as to be soluble in various common solvents.

A crosslinked material incorporating 1,3,5-hexahydrotriazine moiety 60 can also be reformed (re-crosslinked) after breakdown by subsequently exposing the de-crosslinked material to paraformaldehyde. Thus, materials incorporating 1,3,5-hexahydrotriazine moiety 60 based crosslinks can be de-crosslinked and re-crosslinked on demand. This type of chemically reversible crosslinking provides access to polymeric materials with the ability to be reworked, healed, reprocessed, and/or removed as required.

In a particular embodiment, crosslinked polymer 100 can be a bead for use as chromatographic packing material. For example, crosslinked polymer 100 can be a crosslinked polystyrene bead.

Figure 4:
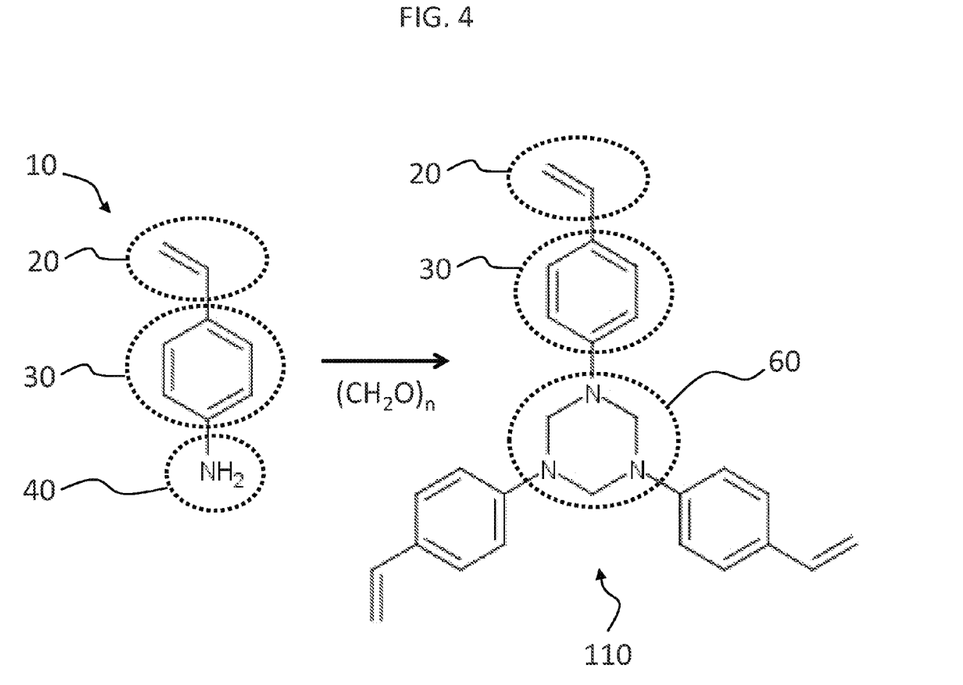
FIG. 4 depicts an exemplary synthetic scheme for preparing a chemically reversing crosslinkable monomer material.

FIG. 4 depicts an exemplary synthetic scheme for preparing a chemically reversing crosslinkable monomeric material. While FIG. 3 depicts a scheme for preparing a chemically reversible crosslinked resin from a primary amine functionalized polymer 90, an alternative method for forming a chemically reversible crosslinked resin would be to polymerize a chemically reversing crosslinkable monomer 110 with other types of monomer material, for example styrene monomer. Alternatively, monomer 110 could be self-polymerized without addition of other monomer types.

In a particular embodiment, crosslinkable monomer 110 can be polymerized along with styrene to form a crosslinked polystyrene bead for use as chromatographic packing material as an example. Such crosslinked beads may be formed using suspension or emulsion polymerization techniques to provide controlled bead sizes. The presence of 1,3,5-hexahydrotriazine moiety 60 in the crosslinked beads would allow for "de-crosslinking" upon exposure to acids such that the initially crosslinked beads could subsequently be dissolved by solvents for removal, recycling, or reprocessing. 1,3,5-hexahydrotriazine moiety 60, as will be discussed further below, can be converted to other functional groups such as thioether and a dithiazine. These groups in turn can be reacted to form various other functional groups allowing the beads to be processed to include a variety of different functional groups.

Figure 5:
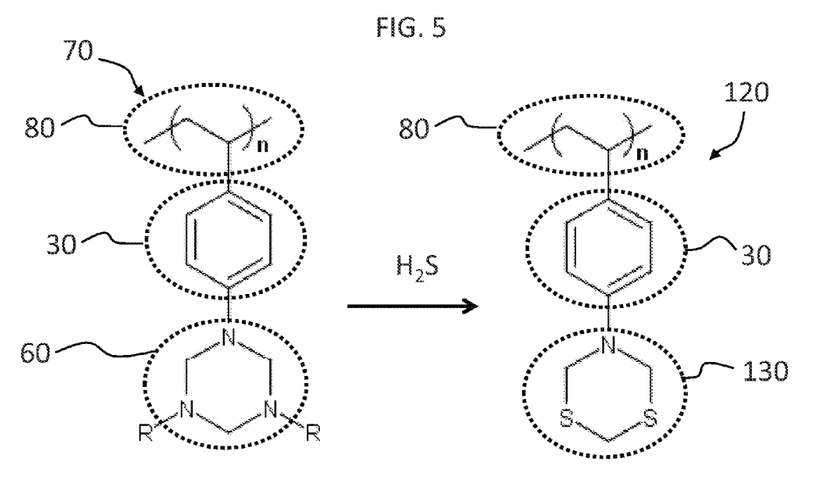
FIG. 5 depicts an exemplary synthetic scheme for preparing a dithiazine functionalized polymer.

FIG. 5 depicts an exemplary synthetic scheme for preparing a dithiazine functionalized polymer from a 1,3,5-hexahydrotriazine functionalized polymer. A 1,3,5-hexahydrotriazine functionalized polymer 70, prepared as described in association with FIG. 1 or FIG. 2, for example, is reacted with hydrogen sulfide (H$_2$S) to form dithiazine functionalized polymer 120. When exposed to H$_2$S, 1,3,5-hexahydrotriazine moiety 60 converts to dithiazine moiety 130, consequently 1,3,5-hexahydrotriazine functionalized polymer 70 converts to dithiazine functionalized polymer 120 upon exposure to H$_2$S. Such H$_2$S exposure may be for purposes of forming the dithiazine functionalized polymer 120 for a subsequent use, or may occur during the use of 1,3,5-hexahydrotriazine functionalized polymer 70 as a sulfur-scavenging material when, for example, 1,3,5-hexahydrotriazine functionalized polymer 70 is included in a oil or natural gas storage tank or pipeline as a coating, an additive, or a filtration medium. In some embodiments, the filtration medium may comprise crosslinked beads formed via suspension or emulsion polymerization techniques. In various embodiments, the filtration medium can be packed into a column, coated on a substrate, or formed into a fabric or mesh.

Figure 6:
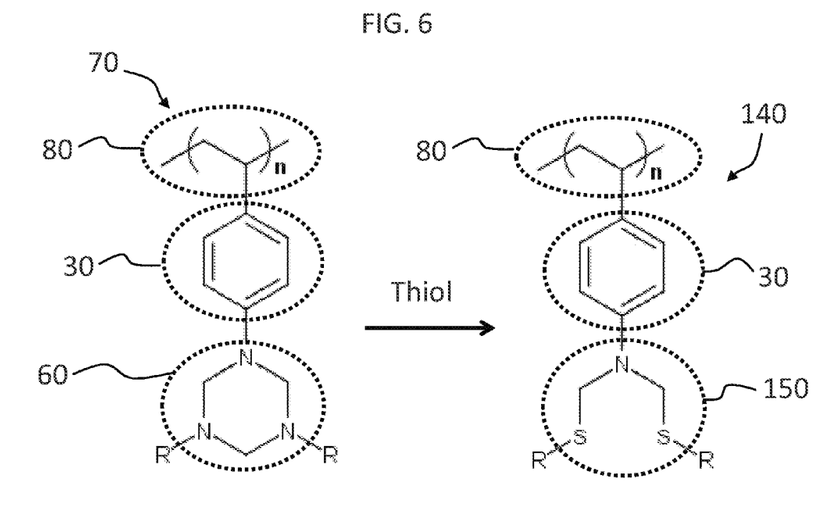
FIG. 6 depicts an exemplary synthetic scheme for preparing a thioether functionalized polymer.

FIG. 6 depicts an exemplary synthetic scheme for preparing a thioether functionalized polymer from a 1,3,5-hexahydrotriazine functionalized polymer. 1,3,5-hexahydrotriazine functionalized polymer 70, prepared as described in association with FIG. 1 or FIG. 2, for example, is reacted with a thiol (R—SH) compound to form thioether functionalized polymer 140. When exposed to a thiol, 1,3,5-hexahydrotriazine moiety 60 converts to thioether moiety 150, consequently 1,3,5-hexahydrotriazine functionalized polymer 70 converts to thioether functionalized polymer 140 upon exposure to a thiol. Without limitation, the thiol (R—SH) compound can be thiophenol, methyl mercaptan (methanethiol), or ethyl mercaptan (ethanethiol).

Figure 7:
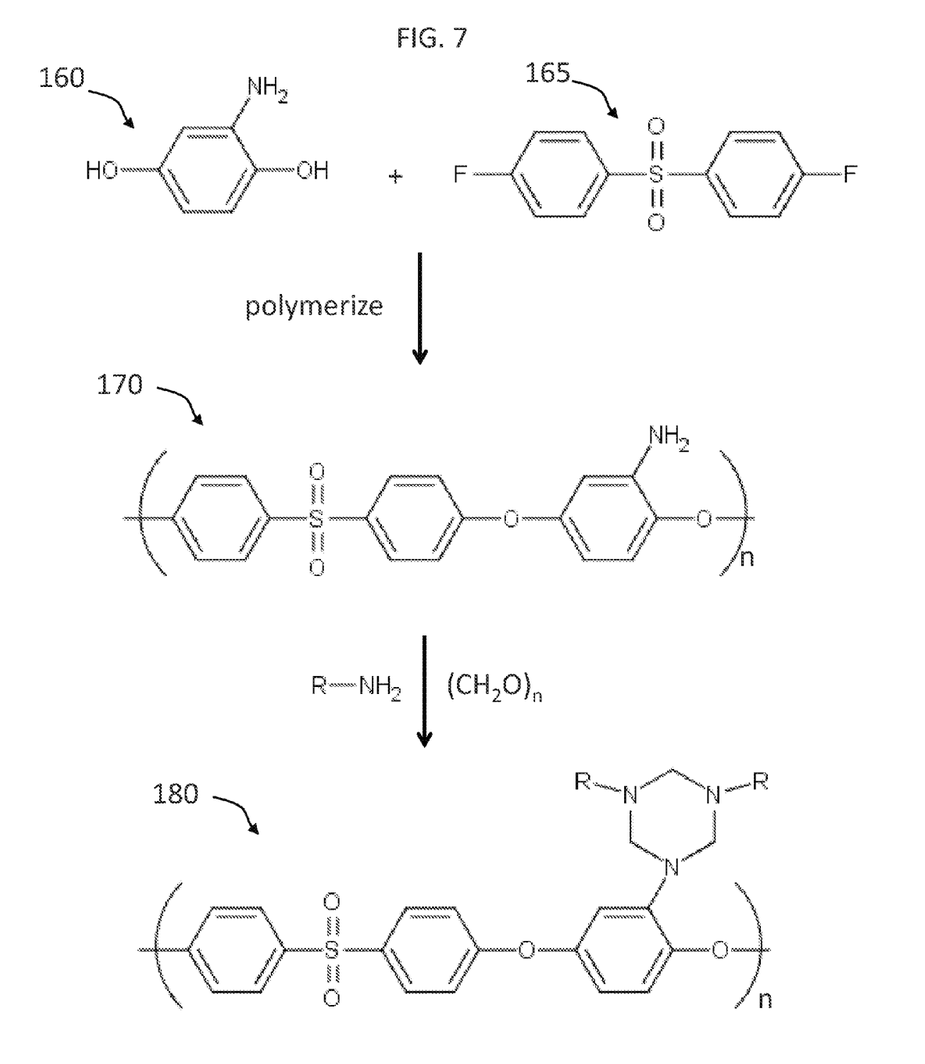
FIG. 7 depicts an exemplary synthetic scheme for preparing a 1,3,5-hexahydrotriazine functionalized polymer from an amino-substituted aromatic diol-type monomer.

FIG. 7 depicts an exemplary synthetic scheme for preparing a 1,3,5-hexahydrotriazine functionalized polymer from an amino-substituted aromatic diol-type monomer. In the depicted scheme, starting material 160 is polymerized with starting material 165 in the presence of, for example, potassium carbonate (K$_2$CO$_3$) and a solvent (such as N-methyl-2-pyrrolidone (NMP)) to form a primary amine substituted polymer 170 via, for example, a nucleophilic aromatic substitution reaction. Primary amine substituted polymer 170 is conceptually similar to primary amine functionalized polymer 90 and may be consider a specific example of primary amine functionalized polymer 90 having a structure in which body groups 30 and polymerized groups 80 are structurally the same components rather than distinct components as depicted in FIG. 2, for example. Primary amine functionalized polymer 170 can be isolated/purified and then may be reacted with a primary amine (R—NH$_2$) and paraformaldehyde ((CH$_2$O)$_n$) to from 1,3,5-hexahydrotriazine functionalized polymer 180. In some embodiments, it may be preferable to react primary amine functionalized polymer 170 with the primary amine (R—NH$_2$) and paraformaldehyde at relatively low temperatures, such as at or below approximately 50° C. to avoid unwanted side reactions.

1,3,5-hexahydrotriazine functionalized polymer 180 is conceptually similar to 1,3,5-hexahydrotriazine functionalized polymer 70 described above. As such, 1,3,5-hexahydrotriazine functionalized polymer 180 may also be reacted according to the schemes depicted in FIG. 5 and FIG. 6 to form corresponding dithiazine functionalized polymers and thioether functionalized polymers, respectively.

While starting material 160 in FIG. 7 is depicted as 2-aminobenzene-1,4-diol, this is a specific example for purposes of explanation only. In general, starting material 160 may be an aromatic diol-type monomer including at least one primary amine substituted aromatic ring or a bisphenol monomer including at least one primary amine substituted aromatic ring. For example, starting material 160 may be selected from a group of compounds including the following:

Starting material 165 is specifically depicted as 1-fluoro-4-(4-fluorobenzenesulfonyl)benzene. However, this is a specific example provided for purposes of explanation only and starting material 165 is not limited to this material. For example, other leaving groups besides fluorine (fluoride ion) could be included in starting material 165. Other halides or tosylate (TsO⁻) ($CH_3C_6H_4SO_2$) could be adopted as the leaving groups in starting material 165. In general, starting material 165 should have at least two accessible leaving groups (e.g., fluoride ions) bonded to aromatic rings so polymerization with starting material 160 (or starting material 190 (see FIG. 8)) may occur via, for example, nucleophilic aromatic substitution reactions. Reaction between starting material 160 and starting material 165 is, in general, promoted by the presence of an electron withdrawing group on the aromatic ring to which the leaving group is attached. Starting material 165 is depicted in FIG. 7 with a sulfonyl group (—$SO_2$—) as the electron withdrawing group, though other electron withdrawing groups may be incorporated instead of or in addition to the sulfonyl group. Thus, as an example scheme, starting material 160 and starting material 165 can be polymerized with each other to form a amino-substituted polysulfone via nucleophilic aromatic substitution. The amino-substituted polysulfone may then be subsequently reacted with a primary amine (R—$NH_2$) and paraformaldehyde (($CH_2O)_n$) to provide a polymeric material having a pendant 1,3,5 hexahydrotriazine moiety. It may be preferable to isolate or purify the amino-substituted polymer (e.g., polymer 170) before reacting it with the primary amine (R—$NH_2$) and paraformaldehyde (($CH_2O)_n$).

In some embodiments, when two or more primary amine functional groups are present in starting material 160, the corresponding 1,3,5-hexahydrotriazine functionalized polymer 180 formed from the starting material 160 may have two or more 1,3,5-hexahydrotriazine moieties and, as such, the corresponding 1,3,5-hexahydrotriazine functionalized polymer 180 may have a repeat unit including two or more 1,3,5-hexahydrotriazine moieties.

In addition, starting material 160 may in some embodiments be processed similarly to starting material 10 as depicted in FIG. 4 to form a material conceptually similar to chemically reversing crosslinkable monomer 110. That is, for example, to form a material such as a material (see FIG. 8) wherein each R group of starting material 190 is a hydroquinone moiety. In forming a material similar to chemically reversing crosslinkable monomer 110 from starting material 160, it may be necessary to protect the phenol-type (—OH) moieties of starting material 160 before the starting material 160 is exposed to paraformaldehyde (($CH_2O)_n$).

Figure 8:
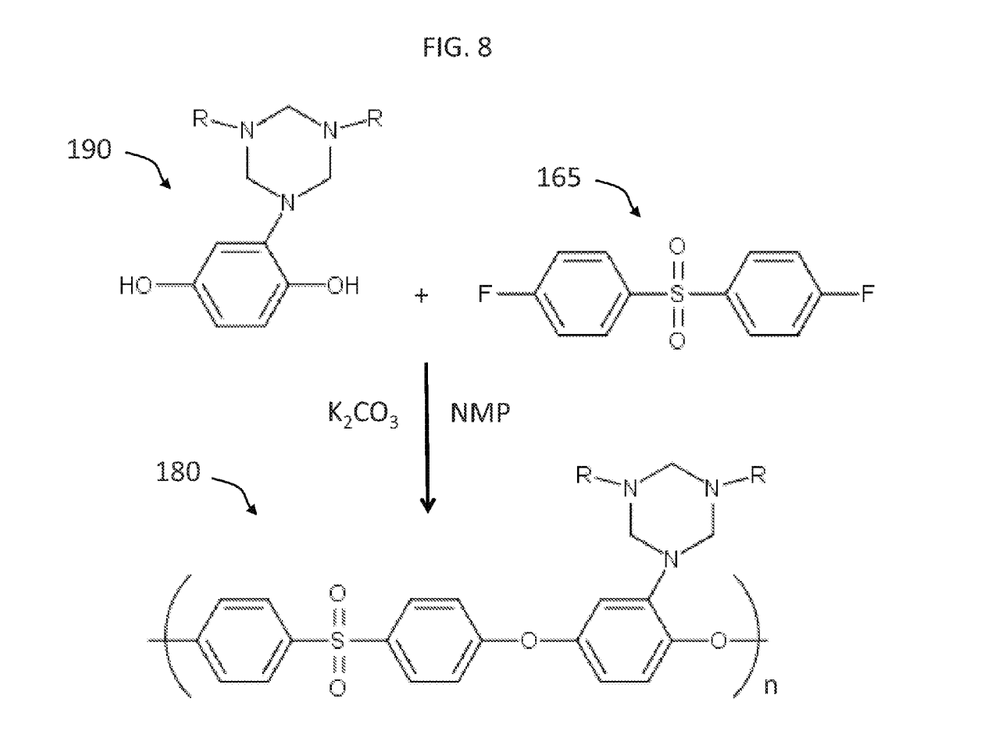
FIG. 8 depicts an exemplary synthetic scheme for preparing a 1,3,5-hexahydrotriazine functionalized polymer from a 1,3,5-hexahydrotriazine-substituted aromatic diol-type monomer.

FIG. 8 depicts an exemplary synthetic scheme for preparing a 1,3,5-hexahydrotriazine functionalized polymer from a 1,3,5-hexahydrotriazine-substituted aromatic diol-type monomer. In FIG. 8, starting material 190 is reacted with starting material 165 in the presence of in the presence of potassium carbonate ($K_2CO_3$) and a solvent (such as N-methyl-2-pyrrolidone (NMP)) to form 1,3,5-hexahydrotriazine functionalized polymer 180.

As depicted in FIG. 8, starting material 190 is a 1,3,5-hexahydrotriazine functionalized aromatic diol-type monomer and starting material 165 is the same as described with respect to FIG. 7. In general, starting material 190 is not limited to specific structure depicted in FIG. 8, but may be any one of a 1,3,5-hexahydrotriazine functionalized aromatic diol-type monomer or a 1,3,5-hexahydrotriazine functionalized bisphenol-type monomer. For example, starting material 190 can be prepared by reaction of starting material 160 with a primary amine (R—$NH_2$) and paraformaldehyde (($CH_2O)_n$) according to a reaction scheme conceptually similar to the reaction of starting material 10 to form 1,3,5-hexahydrotriazine functionalized monomer 50, as described with respect to FIG. 1; however, synthesis of starting material 190 may require first protecting the phenol-type (—OH) moieties of starting material 160 before the starting material 160 is exposed to paraformaldehyde (($CH_2O)_n$). In some embodiments, it may be possible to use a protected version of starting material 190 (that is, starting material 190 with protecting groups still at the phenol-type (—OH) positions) directly in the polymerization reaction with starting material 165 since condensation reaction conditions (e.g., high temperatures) may be selected that remove the protecting groups from the protected version of starting material 190, effectively making (unprotected) starting material 190 available for reaction with starting material 165.

In some embodiments, when two or more primary amine functional groups are present in starting material 160, the corresponding starting material 190 formed from starting material 160 may have two or more 1,3,5-hexahydrotriazine moieties and, as such, the corresponding 1,3,5-hexahydrotriazine functionalized polymer 180 may have a repeat unit including two or more 1,3,5-hexahydrotriazine moieties.

"R" as used in the above descriptions of chemical structures refers to a radical unit including at least one carbon atom. "R" may be the same or different in each instance of use within a chemical structure. That is, two or more "R" groups depicted in a single chemical structure are not necessarily the same radical unit, though they may be the same in some embodiments. Additionally, "R" depicted in different chemical structures or compounds is not necessarily the same radical unit and may, in general, be independently selected. Without limitation, a radical unit depicted as "R" may include an alkyl group, an aryl group, a silane group, an alkyne group, an alkene group, an alcohol group, an epoxide group, an amine group, a cyanate group, a carboxylic acid group, an ester group, a phenolic group, and/or a succinimide group. In specific embodiments, the radical unit depicted as "R" may be a methyl group, a methanol group, a primary amine substituted alkyl group, a tertiary amine substituted alkyl group, or a triethoxysilane group. In some embodiments, "R" may represent a portion of a polymeric or oligomeric chain.

In general, in this specification and accompanying figures, when a molecular structure includes a repeating group designated as repeating for "n" units, this designation indicates that the material is polymeric or oligomeric rather than that "n" has a specific numerical value and the different instances of "n" within formulas or figures are not required to have the same numerical value. Furthermore, polymeric and oligomeric materials (as compared to a single molecule of a polymeric or oligomeric material) may have a distribution of chain lengths ("n" values) rather than a single chain length ("n" value). Thus, when referring to polymeric or oligomeric materials rather than an individual molecule of such materials, "n" need not be a specific numerical value or even an integer value, but rather may correspond to some averaged value for the distribution of the degree of polymerization for molecules within the material. The specific distribution of "n" values is generally determined by the details (e.g., relative amount of initiator to monomer, temperature, reaction times, method of polymerization, etc.) of the process used in forming the polymeric or oligomeric material, but materials may also subsequently processed (e.g., sorted/separated by size after synthesis) to alter the distribution of "n" values. Similarly, in this specification and accompanying figures, within molecular formulas that include different repeating groups (e.g., as in crosslinked polymer 100), each of the different repeating groups may be designated as repeating for "n" units; however, in this context, this does not imply each of the different repeating groups within the molecular formula repeats for the same specific "n" value (though without limitation these "n" values may also be the same). In general, the value of "n" for any specific molecule of a polymeric material may be any number that is accessible by at least one polymerization method and the value of "n" is not otherwise limited. For example, in some embodiments, "n" for a specific molecule may be any number greater than one (1) and less than or equal to about three hundred (300). In other embodiments, "n" for a specific molecule may be any number greater than or equal to about ten (10) and less than or equal to about one hundred (100). In some embodiments, when a 1,3,5-hexahydrothiazine, dithiazine, or thioether monomer group is included in a copolymer, the value of "n" associated with such a monomer group may be equal to or greater than one (1) and less than or equal to about three hundred (300). In other embodiments, when a 1,3,5-hexahydrothiazine, dithiazine, or thioether monomer group is included in a copolymer, the value of "n" associated with such a monomer group may be equal to or greater than about ten (10) and less than or equal to about one hundred (100).

The descriptions of the various example embodiments have been presented for purposes of illustration, and are not intended to be exhaustive representations of the present disclosure. Many modifications and variations will be apparent to those of ordinary skill in the art without departing from the scope of the present disclosure. The terminology used herein was chosen to best explain the principles of the various embodiments, the practical application or technical improvement over technologies found in the marketplace, or to enable others of ordinary skill in the art to understand the embodiments disclosed herein.

While the foregoing is directed to embodiments of the present disclosure, other and further embodiments of the disclosure may be devised without departing from the scope of the present disclosure, and the scope of the present disclosure is determined by the claims that follow.

What is claimed is:

1. A method, comprising:
exposing a first monomer including a primary amine functional group to paraformaldehyde and a first primary amine compound and forming a second monomer including a 1,3,5-hexahydrotriazine group; and
polymerizing the second monomer and forming a first polymer including the 1,3,5-hexahydrotriazine group.

2. The method of claim 1, further comprising:
exposing the first polymer to hydrogen sulfide.

3. The method of claim 1, further comprising:
exposing the first polymer to a thiol compound.

4. The method of claim 1, wherein the first monomer is one of an amino-substituted styrene, an amino-substituted bisphenol, an amino-substituted aromatic diol, and an amino-substituted methacrylate.

5. The method of claim 1, wherein polymerizing the second monomer and forming the first polymer includes a radical initiated polymerization.

6. The method of claim 1, wherein the first primary amine compound has the same chemical structure as the first monomer.

7. The method of claim 1, wherein the 1,3,5-hexahydrotriazine group is pendant on the first polymer.

8. The method of claim 1, wherein the 1,3,5-hexahydrotriazine group is part of a crosslink in the first polymer.

9. The method of claim 1, wherein the first polymer is a copolymer of the second monomer and a third monomer.

10. The method of claim 9, wherein the third monomer is styrene.

11. The method of claim 1, further comprising:
exposing the first polymer to acid and forming a second polymer including a primary amine functional group.

12. A method, comprising:
polymerizing a first monomer including a primary amine functional group and forming a first polymer including the primary amine functional group; and
exposing the first polymer to paraformaldehyde and a first primary amine compound and forming a second polymer including a 1,3,5-hexahydrotriazine group.

13. The method of claim 12, wherein the first primary amine compound has the same chemical structure as the first polymer.

14. The method of claim 12, further comprising:
exposing the second polymer to hydrogen sulfide or a thiol compound.

15. The method of claim 12, wherein the first monomer is one of an amino-substituted styrene, an amino-substituted bisphenol, an amino-substituted aromatic diol, and an amino-substituted methacrylate.

16. The method of claim 12, wherein the first polymer is one of a block copolymer, a star polymer, a comb polymer, and a hyperbranched polymer.

17. The method of claim 12, further comprising:
exposing the second polymer to acid and re-forming the first polymer.

* * * * *